3,545,255
METHOD AND APPARATUS FOR DETERMINING THE MOLECULAR WEIGHT OF VOLATILE COMPOUNDS
Eugene J. Levy, Oxford, and Donald G. Paul, Kennett Square, Pa., assignors to Hewlett-Packard Company, Palo Alto, Calif., a corporation of California
Filed Oct. 23, 1968, Ser. No. 769,912
Int. Cl. G01n 31/08, 9/00
U.S. Cl. 73—30                                                    10 Claims

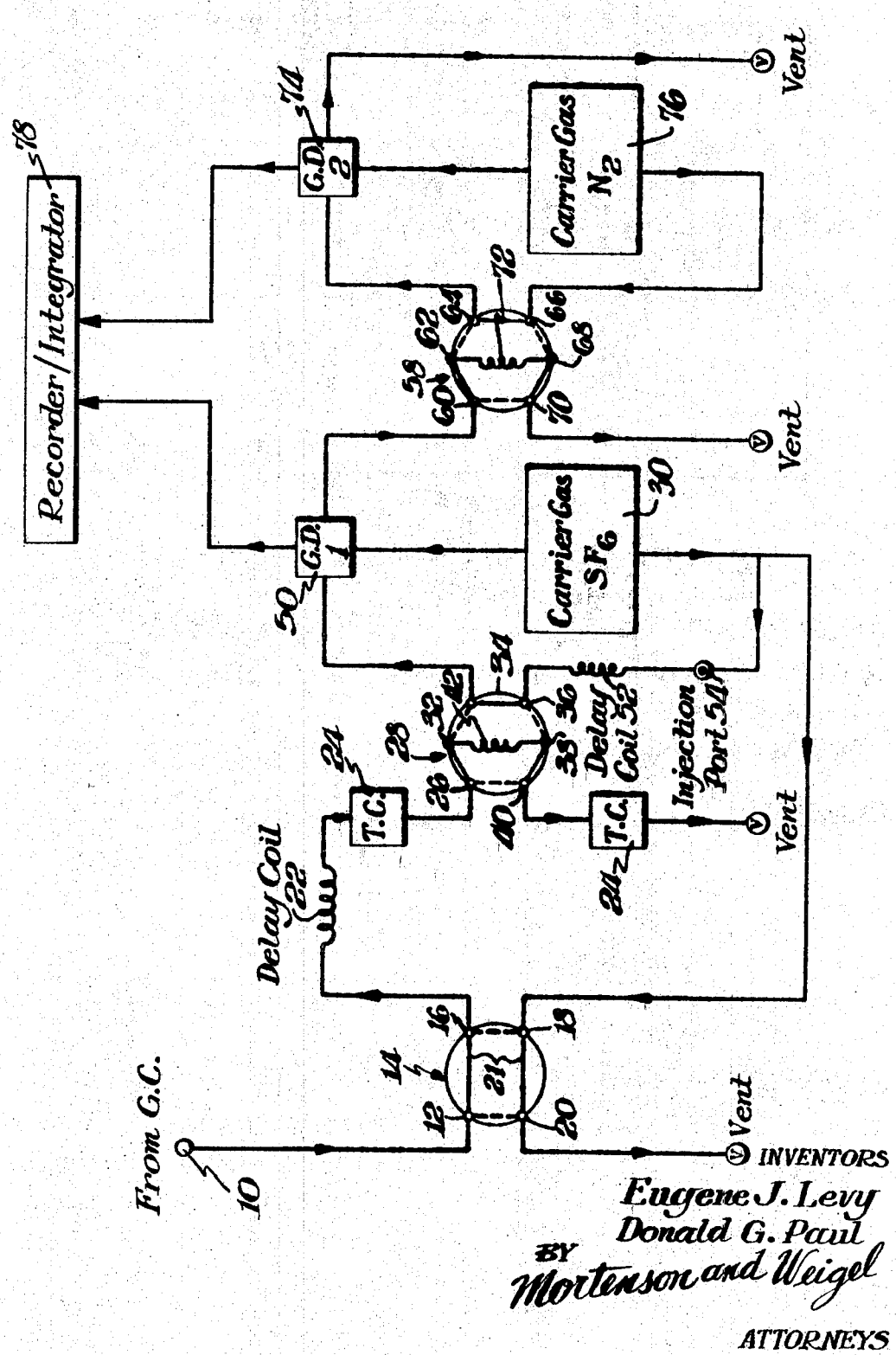

ABSTRACT OF THE DISCLOSURE

A system is described in which a vaporized, volatile sample is passed through a first gas density balance using a first carrier gas. The volatile ample is then trapped and passed through a second density balance using another carrier gas different than the first carrier gas. By measuring the unequal responses (normally the peak area) of each of the gas density balances to the same sample, and with a knowledge of the molecular weights of the respective carrier gases, the molecular weight of the sample may be determined.

BACKGROUND OF THE INVENTION

This invention relates to a method and apparatus for determining molecular weights and, more particularly, to a method and apparatus of determining the molecular weight of volatile samples over a relatively wide mass range quickly and with a relatively high degree of accuracy.

Molecular weight analysis of volatile compounds may be one of the most important single pieces of information an organic chemist can obtain about an unknown molecule. In spite of this fact, it is one determination least generally available to him utilizing ordinary laboratory techniques. The most common method employed to determine molecular weight is mass spectrometry. Unfortunately, the mass spectrometer itself is a relatively expensive instrument requiring relatively skilled personnel to operate and is somewhat time consuming. In addition many molecules such as $CCl_4$ do not have molecular ions and their molecular weight cannot be determined using mass spectrometry techniques.

With the advent of the gas density cell, developed by Martin and James several years ago, a new technique became available for determining molecular weights of volatile compounds. As is known, the gas density cell has reference and measuring gas inputs and uses the same gas as reference and measuring gases. The reference gas enters the cell and is split vertically into two channels and in each of which passed over a sensing element which may be of conventional thermistor or other temperature sensitive elements. The two reference channels then recombine and are vented. The measuring gas containing the vapor of the volatile compound under test also enters the cell and is split into two channels which combine the measuring gas with the reference gas immediately after the reference gas is passed through the detecting elements.

In the absence of a sample, the flow of the reference gas through its two channels is balanced and the electrical output of the cell is zero. The addition, however, of the sample vapor to the measuring carrier gas causes the flow through the respective reference channels to change in accordance with the density difference between the sample vapor and the reference gas. If the sample has a greater density than that of the reference gas, more of the sample flows through the lower flow path causing the gas flow past the detecting element in this flow path to be slower. Conversely, the flow rate of the reference gas to the upper channel increases. This change in flow causes a change in the electrical resistance by the detecting elements, which manifests itself as an electrical output signal from the bridge circuit of the gas density balance.

If the sample is of lighter density than the reference gas, the reverse is true—the flow rate through the upper channel decreases and that of the lower channel increases. This bridge output signal is seen by the recorder as a conventional peak which results in an area between the trace recording and the base line. This means that one expects to see both positive and negative deflections on the recorder due to the fact that the sample is either more or less dense than its carrier.

Among the molecular weight determination systems of the prior art using these gas density cells is one developed by Liberti et al. which is described in an article beginning on page 1067 of the Nov. 10, 1956 issue of "Nature," vol. 178. Liberti et al. proposed determining molecular weights using a gas density cell by measuring the cell's change in response to a vaporized volatile sample in the presence of two different carrier gases of different molecular weights. The measurement is made by successive separate injections of the same volatile compound using first one carrier gas and then the second carrier gas. The relationship of the peak area responses of the gas density cell to these two runs is used to compute the molecular weight of the unknown compound. The method is particularly useful in that it permits the determination of all of the peaks or eluted components of a chromatograph to be determined provided that the molecular weight of at least one of the eluted compounds is known. Unfortunately, however, the Liberti et al. method is only capable of providing a molecular weight determination with an accuracy approaching 4%. Relatively small percentage errors in the determination of the peak areas magnify themselves in the final determination. Furthermore, the technique requires that the ratio of the two sample components (unknown and known molecular weights) in each of the two runs be constant within 1%.

Still another technique was suggested by Phillips and Timmes in an article appearing on page 131 of the "Journal of Gas Chromatography" vol. 5 (1961). Phillips et al. propose making pressure measurements of the pressure and volume of a vapor and then passing it through the gas density balance. With the pressure and volume known, the molecular weight can be computed by measuring the resulting peak area response of the gas density cell. The greatest difficulty with the Phillips et al. method is that the pressure and volume measurements are not only time consuming but relatively imprecise. Furthermore, for many compounds, particularly those appearing in the effluent of a gas chromatographic run, the accurate measurement of pressure and volume is difficult if not impossible. Hence, from a practical standpoint, this technique is not satisfactory.

It is, therefore, an object of this invention to obviate many of the disadvantages inherent in the prior art techniques for determining molecular weights using gas density cells.

Another object of this invention is to provide an improved method for determining the molecular weight of volatile compounds.

Still another object of this invention is to provide an improved apparatus that permits the accurate determination of the molecular weights of volatile compounds.

BRIEF DESCRIPTION OF THE INVENTION

The preferred method of this invention permits the determination of the molecular weight of an unknown volatile compound utilizing a pair of gas density cells. The same sample of the unknown compound is analyzed by each of the gas density cells using dissimilar carrier gases. Based upon such analysis, the relative time integral of the responses of the cells to the sample for each carrier gas used yields a ratio that is proportional to the molecular weight of the unknown compound.

A preferred system for performing the method of this invention is constructed of two gas density cells joined together by a six-way valve. A chromatographic trapping column is placed across two ports of the valve. This permits a sample coming from the first gas density cells to be trapped on the column with the valve in one position and backflushed into the second gas density cell with the valve in another position. To make the molecular weight determination, a sample of the unknown compound is injected into a stream containing the first carrier gas which carries a sample through the first gas density cell to provide a first response. The sample is then trapped in the trapping column, backflushed using the second carrier gas from the trapping column, and passed through the second gas cell using the second carrier gas to provide a second response. Since there is no sample lost in going from one carrier gas environment to the other, the ratio of the responses of the two cells is related to the molecular weight of the unknown compound.

BRIEF DESCRIPTION OF THE DRAWINGS

The novel features that are considered characteristic of this invention are set forth with particularity in the appended claims. The invention itself, however, both as to its organization and method of operation, as well as additional objects and advantages thereof, will be best understood from the following description when read in connection with the accompanying drawings in which the sole figure is a schematic diagram of a system constructed in accordance with this invention for determining the molecular weight of unknown volatile components.

DESCRIPTION OF THE PREFERRED EMBODIMENTS

The preferred system of this invention, whose flow diagram is illustrated in the sole figure, is adapted to receive an unknown, volatile, organic compound whose molecular weight is to be determined either by way of direct injection or by selection through a suitable valve of one of the eluted components from a conventional gas chromatograph or other separating device. Thus, the inlet of the flow system, designated by the small circle 10, is denoted as being from a gas chromatograph G.C. The gas chromatograph may be any conventional chromatographic system capable of separating in conventional manner the components of an input sample. In any event, the input 10 from the gas chromatograph G.C. is connected to one port 12 of a two-position, four-port valve 14. The four-port valve may be of conventional design and operates to interconnect either of the adjacent pairs of its four ports 12, 16, 18, and 20. The valve 14 is illustrated as being in its first position with the adjacent ports 12–16 and 18–20 being interconnected as indicated by the solid lines 21. When the valve 14 is rotated to its second position, the remaining pairs of ports 12–20 and 16–18 are interconnected as denoted by the dotted lines. The second port 16 of the valve 14 is connected through a delay coil 22 to one side of a nondestructive detector 24 such as a thermal conductivity detector and thence to the first port 26 of a two-position, six-port valve 28.

The third port 18 of the four-port valve 14 is connected to receive a first carrier gas from a carrier gas source denoted by the block 30. In this instance, for purposes of illustration, this carrier gas is designated as sulphur hexafluoride ($SF_6$). The fourth port 20 is connected through a suitable conduit to vent. All of the conduits employed to complete the various connections and provide flow paths for the gases described herein may be of stainless steel or other suitable tubing as is well known in the art.

The first six-port valve 28 has, in addition to the first port 26, additional ports 32, 34, 36, 38, and 40 in clockwise order. A trapping means such as a column or delay coil 42 is connected between the second and fifth ports 32 and 38, respectively. The column 42 may be a conventional gas chromatographic separating column packed with a suitable packing material to permit the trapping of the eluted component from the gas chromatograph input. The packing, for example, may be that sold under the trademark "Polypak" which is a polymer material and is available for Hewlett-Packard Company, Avondale, Pa.

With the first six-port valve 28 in its first position, the adjacent pairs of ports including the first and second, 26–32, and third and fourth, 34–36, and fifth and sixth, 38–40, are interconnected as denoted by the solid lines interconnecting these ports. Conversely, with the valve in its second position, the remaining pairs of ports are interconnected, i.e., the second and third, 32–34, the fourth and fifth, 36–38, and the sixth and first, 40–26. While the column 42 has been described as a packed column, in the alternative it may be simply an open tube or conduit of sufficient length to provide a volume to allow an entire eluted component as represented by a recorded peak to enter the open tube and be entrained therein for switching. In still another alternative, the delay coil 42 may have a short section of packed column sufficient to separate the eluted component under test from the carrier gas employed in the gas chromatograph and a volume as provided by a straight coil of tubing as may be necessary or desirable to buffer the system from flow irregularity due to the switching.

The sixth port 40 of the first six-port valve 28 is connected to the remaining side, if desired, of the thermal conductivity detector 24 and hence bears the same reference numeral. The output of the second side of the thermal conductivity detector is connected to vent. The remaining third and fourth ports of the valve 28 are connected respectively to the measuring input of a first gas density balance, denoted by the block 50 which bears the caption G.D. 1. The gas density balance or cell may be of conventional type as has been hereinbefore described. The second or reference input of the gas density cell 50 is provided from the first carrier gas source 30. The fourth port 36 of the valve 28 is connected through a third delay coil 52 and injection port 54 to the first carrier gas source 30. The injection port 54 may be of conventional design and permits the direct injection of a sample for analysis rather than utilizing the effluent of a gas chromatograph. The delay coil 52 may be simply, as in the case of delay coils 22 and 42, a coil of tubing of sufficient volume to permit the flow of the carrier gas to stabilize after a sample has been injected for vaporization in the injection port 54. Stabilizing or buffering techniques of this type are well known.

The output of the first gas density cell 50 is connected to the first port 60 of a second two-position, six-port valve 58. The remaining five ports of the valve 58 are denoted by the reference numerals 62, 64, 66, 68, and 70, respectively. With the valve 58 in the first position, the adjacent pairs of ports 60–70, 62–64, and 66–68 as denoted by the dotted lines become interconnected. The second and fifth ports are connected to a trapping column 72 which may be similar in design and function to the first trapping column 42. Each of the trapping columns may preferably have a heater (not shown) which permits them to be quickly heated as desired to facilitate eluting the trapped sample from the column. The third port 64 is connected to the measuring input of a second gas density cell as denoted by the block 74. A second source of carrier gas, denoted by the block 76, is connected to the reference input of the second gas density cell 74 and to the fourth port 66 of the valve 58. The sixth port 70 of the valve 58 is connected to vent. The output of the second gas density cell 74 is also connected to vent. Appropriate pressure regulators may be used on the inputs of each of the several conduits which lead to the third port 18 of the four-port valve 14, the fourth port 36 of the first valve 28, the reference input of the first gas density cell 28, the reference input of the second gas density cell 74, and the fourth port 66 of the second valve 58. These isolate flow disturbances within the system and permit a constant flow rate to be attained.

The electrical outputs of the respective gas density cells 50 and 74, respectively, are connected to either or both of a recorded and integrator 78. The recorder makes a visual recording of the variations in the cells output signals as a function of time. This recording provides visual integral peaks whose area is the quantity sought. These peak areas may be integrated automatically using known techniques and divided to provide the desired ratio for use in computing the molecular weight as will be described. In fact, the entire computation may be accomplished using known analog or digital computing techniques. The particular computational techniques whether performed automatically or by hand do not constitute a part of this invention.

A preferred method according to this invention of determining molecular weight will be described with reference to the flow diagram illustrated in the sole figure with the assumption that the sample is injected directly at the injection port 54. In this event the four port valve 14 and the first six port valve 28 are not used and may be omitted from the system if desired. The injected sample is vaporized as the injection port 54 and passed through the delay coil 52. For the purpose of illustration it will be assumed that the first carrier gas source 30 supplies sulphur hexafluoride (SF$_6$) and the second carrier gas source 76 supplies nitrogen (N$_2$). The now vaporized sample whose molecular weight is to be determined passes from the delay coil 52 through the third and fourth ports of the valve 28 and thence to the first gas density cell 50. The first gas density cell 50 provides an integral response which for the sake of simplicity will be considered to be a peak area as recorded on a recorder of conventional type. This response may be designated by the symbol ASF$_6$. After passage through the first gas density cell during which the area response ASF$_6$ is recorded, the entire volatile sample under test passes without loss to the second valve 58 which, in its first position, permits the volatile sample to become trapped in the delay column 72. The second valve is now switched to its second position illustrated by the dotted lines. This allows a different carrier gas, in this illustrative case nitrogen (N$_2$), to backflush the sulphur hexafluoride (SF$_6$) from the delay column 72. The column retains the volatile sample trapped. When all of the first carrier gas SF$_6$ is purged off, the delay column 72 is quickly heated from ambient temperature, typically 70° C., up to a higher temperature, typically 230° C. The sample then elutes from the delay column 72 and passes now entrained in the second nitrogen (N$_2$) carrier gas through the second gas density cell 74 which provides an integral response. This integral response is deignated symbolically by the peak area AN$_2$. Having recorded these two peak responses of the same volatile sample passing through two separate gas density cells while entrained in two separate carrier gases whose molecular weights are known, the molecular weight of the sample may now be determined. It is important to remember that there is no loss of sample in passing from one carrier gas environment and one gas density cell to the other. The fact that there is no sample lost during the analysis is the basis of the computation which permits the molecular weight to be determined. This equality of sample permits us to equate the known cell formulas for the two gas density cells by means of their common variable, weight.

The general equation for a gas density cell which relates the molecular weight of the sample, the molecular weight of the carrier gas, the sample weight and the area response of the cell is $$qx = k_1 A_x \left( \frac{Mx}{Mx - Mc} \right) \quad (1)$$

Where: $qx$ is the sample weight of an unknown sample $x$ having an area response $A_x$ where $k_1$ is the gas density cell constant for given conditions and carrier gas flow, $Mx$ is the molecular weight of the unknown sample and $Mc$ is the molecular weight of the carrier gas used in the gas density cell. Similarly for the second gas density cell the unknown sample $x$ of weight $qx'$. The area response $A_x'$ is related to the sample weight $qx'$ by $$qx' = k_2 A_x' \left( \frac{-Mx}{Mx - Mc'} \right) \quad (2)$$

Where: $k_2$ is the gas density balance constant for a second cell under similar conditions but different carrier gas of molecular weight $Mc'$.

According to the invention, the sample weights passing through the two gas density cells 30 and 76 are substantially identical. Therefore, we may equate the two sample weights and solve for $Mx$ simply by equating Equations 1 and 2. This yields:

$$k_1 A_x \left( \frac{Mx}{Mx - Mc} \right) = k_2 A'_x \left( \frac{Mx}{Mx - Mc'} \right) \quad (3)$$

$$\frac{k_1 A_x}{k_2 A'_x} = \frac{Mx}{(Mx - Mc')} \cdot \frac{(Mx - Mc)}{Mx} = \frac{(Mx - Mc)}{(Mx - Mc')} \quad (4)$$

Let $$y = \frac{k_1 A_x}{k_2 A'_x} \quad (5)$$

then:

$$y = \frac{Mx - Mc}{Mx - Mc'} \quad (6)$$

and $y(Mx - Mc') = Mx - Mc$

Solving for $Mx$:

$$Mx = \frac{yMc' - Mc}{(y - 1)} = \frac{Mc - yMc'}{1 - y}$$

Now let $k$, the system constant, equal the ratio of the cell constants: $k = k_1 / k_2$.

To solve for the system constant $k$, a standard sample such as heptane (N—C$_7$H$_{16}$) is chosen and run through the system, and the area ratio $A_x / A_x'$ determined and substituted in Equation 4. Heptane has a molecular weight of 100. Therefore, taking into consideration the two carrier gases employed, sulphur hexafluoride having a molecular weight of 146 and nitrogen having a molecular weight of 28, Equation 4 becomes:

$$\frac{kA_{SF_6}}{A_{N_2}} = \frac{Mx - M_{SF_6}}{Mx - M_{N_2}} = \frac{100 - 146}{100 - 28}$$

$$\frac{kA_{SF_6}}{A_{N_2}} = -0.639 \text{ or } k = -.639 \frac{A_{N_2}}{A_{SF_6}}$$

The determination of the system constant ($k$) by means of using a known compound such as heptane now allows us to solve for unknown molecular weights. The molecular weights of an unknown compound may be determined by utilization of the formula $$Mx = \frac{yM_{N_2} - M_{SF_6}}{(y-1)} \qquad (8)$$

where $$y = \frac{kA_{SF_6}}{A_{N_2}}$$

The molecular weights of the two carrier gases are known, hence, the molecular weight is readily determinable by the simple computation of the term ($y$) which is the area ratio of the responses of the two gas density cells 50 and 74 to the common unknown sample. For the carrier gases selected, the molecular weight of the unknown compound is determined by the formula $$Mx = \frac{y(28) - 146}{y - 1}$$

The determination of molecular weight may be made either manually or automatically using the integrator 78 and known computational techniques.

The only requirement upon the selection of carrier gases is that they must allow the selected mass ranges of the unknown samples to be tested. Hence, at least one of the gases must have a sufficiently high molecular weight so that there is a rate of change as a function of the molecular weight of the unknown when used in a typical gas density cell. In other words, the carrier gases employed must show a significant rate of change as a function of molecular weight of the sample under test throughout the entire mass range desired.

When the system, whose flow diagram is illustrated in the sole figure, is used with a chromatograph effluent, the operation is substantially the same. The only difference is that the four port valve 14 is switched to the first position shown to permit a particular peak from a gas chromatograph to pass through the delay coil 22 and the T.C. cell 24 to be trapped on the first column 28. Once trapping is achieved the four port valve 14 is switched to the second position so that the G.C. output, as denoted by the dotted line, again flows to vent. Flow stopping techniques may be used to permit several or all of the eluted peaks of the gas chromatograph to be measured.

Now, the sulphur hexafluoride carrier gas flowing through ports 18–16 purges any of the remaining carrier gas used in the gas chromatograph from the trapping column 42. Once the carrier gas from the chromatograph system is purged, the first valve 28 is switched to its second position such that the trapping column 42 is now in the flow stream of the first gas density cell 50. The trapping column 42 is heated as it is backflushed such that the trapped sample component from the gas chromatograph passes through the first gas density cell 50 and the operation proceeds as previously described. Various other valving and switching techniques may be employed to effect the trapping of the sample under test between the gas density cells. Such modifications are too numerous to specify herein.

There has thus been described a relatively accurate method and system for determining the molecular weight of volatile compounds. The system requires only that the flow rate of the carrier gases be maintained constant. No measurement need be made of the pressure, the volume or the mass of the unknown sample under test. Relatively high degrees of accuracy in the determination of molecular weights over a relatively large mass range have been obtained using this system.

It will be obvious that various modifications may be made in the apparatus and in the manner of operating it. It is intended to cover such modifications and changes as would occur to those skilled in the art, as far as the following claims permit and as far as consistent with the state of the prior art.

What is claimed is:

1. A method of determining the molecular weight of a volatile sample using first and second gas density cells each having reference and sample gas flow systems and corresponding detectors for providing an electrical output signal that varies in accordance with the difference in densities between the gases flowing through the sample and reference flow systems, said method comprising the steps of:
   passing said sample through said first cell using a first carrier gas for both said reference and sample gas flow systems,
   trapping said sample after passage through said first cellthereby to separate said sample from said first carrier gas,
   entraining the separated sample in a second carrier gas different from said first carrier gas, and
   passing the sample entrained in said second carrier gas through said second cell using said second carrier gas for both said reference and sample gas flow systems, whereby the ratio of said first and second cell's electrical output signal variations is a function of the molecular weight of said sample.

2. A method according to claim 1 which includes the initial step of trapping one of the eluted components of a gas chromatograph system, thereby to obtain said votatile sample separated from the carrier gas employed in said chromatograph system.

3. A method according to claim 2 which includes the additional step of entraining said volatile sample in said first carrier gas after trapping for passage through said first step.

4. Apparatus for determining the molecular weight of a volatile sample using first and second gas density cells each having reference and sample gas flow systems for providing an electrical output signal that varies in accordance with the difference in densities between the gases flowing through said sample and reference gas flow systems, said apparatus comprising:
   means for supplying a first carrier gas to said first cell reference flow system,
   first means for passing said sample in gaseous form through said first cell sample flow system using said first carrier gas,
   means for supplying a second carrier gas different from said first carrier gas to said second cell reference flow system,
   second means connected between said cells for passing said sample from said first cell through said second cell using said second carrier gas, said second means including:
      means for separating said sample from said first carrier gas; and
      means for entraining the separated sample in said second carrier gas,
   whereby the ratio of the first and second cell's responses to said sample, as evidenced by variations in said output signals, is a function of the molecular weight of said sample.

5. An apparatus according to claim 4 which also includes recording means connected to said cells for recording the variations of said electrical output signals.

6. An apparatus according to claim 4 wherein said separating means is a packed chromatographic separating column.

7. An apparatus according to claim 4 wherein said separating means is a serially connected packed chromatographic separating column and a length of conduit having a volume sufficient to hold said sample.

8. An apparatus according to claim 4 which also includes:
   vaporizing means, and
   means connected to said first cell for introducing said sample in liquid form to said vaporizing means for vaporization and entrainment in said first carrier gas.

9. Apparatus according to claim 4 which also includes:
a gas chromatograph, and
valving means connected to the output of said chromatograph for passing a portion of the effluent therefrom to said first cell.

10. A method of determining the molecular weight of a volatile sample comprising the steps of:
vaporizing the sample,
measuring the density of said vaporized sample entrained in a first carrier gas,
separating said vaporized sample from said first carrier gas after said measuring step is completed, and
subsequently measuring the density of the separated and vaporized sample entrained in a second carrier gas dissimilar from said first carrier gas, whereby the ratio of said densities is related to the molecular weight of said sample.

References Cited
UNITED STATES PATENTS 2,728,219  12/1955  Martin _____ 73—30
3,063,286  11/1962  Nerheim _____ 73—23.1

RICHARD C. QUEISSER, Primary Examiner

C. E. SNEE III, Assistant Examiner

U.S. Cl. X.R.

73—23.1